United States Patent
Costa et al.

(10) Patent No.: US 9,564,042 B2
(45) Date of Patent: Feb. 7, 2017

(54) COMMUNICATION SYSTEM WITH IMPROVED SAFETY FEATURE

(71) Applicant: MOTOROLA SOLUTIONS, INC, Schaumburg, IL (US)

(72) Inventors: Fabio M. Costa, Weston, FL (US); Alejandro G. Blanco, Fort Lauderdale, FL (US); Scott M. Alazraki, Davie, FL (US); Shervin Sabripour, Plantation, FL (US); Freddy R. Torres, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 806 days.

(21) Appl. No.: 13/917,257

(22) Filed: Jun. 13, 2013

(65) Prior Publication Data
US 2014/0368658 A1    Dec. 18, 2014

(51) Int. Cl.
G08B 21/04    (2006.01)
G08B 25/01    (2006.01)
H04N 7/18    (2006.01)

(52) U.S. Cl.
CPC ............ G08B 25/016 (2013.01); H04N 7/188 (2013.01)

(58) Field of Classification Search
CPC .... G08B 25/016; G08B 21/0446; H04N 7/188
See application file for complete search history.

(56) References Cited

U.S. PATENT DOCUMENTS

| | | | |
|---|---|---|---|
| 7,698,276 B2 | 4/2010 | Seshadri et al. | |
| 8,325,882 B1 | 12/2012 | Klesper et al. | |
| 8,442,839 B2 | 5/2013 | Yen et al. | |
| 9,143,670 B1* | 9/2015 | Cilia | H04N 5/23245 |
| 2004/0070515 A1 | 4/2004 | Burhley et al. | |
| 2004/0192335 A1* | 9/2004 | Wong | H04W 64/00 455/456.1 |
| 2006/0047447 A1* | 3/2006 | Brady | A63B 71/0605 702/41 |
| 2008/0249969 A1 | 10/2008 | Tsui et al. | |
| 2009/0174547 A1 | 7/2009 | Greene et al. | |
| 2010/0029243 A1 | 2/2010 | Ozer et al. | |
| 2010/0241465 A1 | 9/2010 | Amigio et al. | |
| 2011/0165998 A1* | 7/2011 | Lau | A63B 24/0062 482/8 |
| 2011/0237217 A1 | 9/2011 | Monks et al. | |

(Continued)

FOREIGN PATENT DOCUMENTS

CA    2808222 A1    2/2012
EP    2479966 A1    7/2012
(Continued)

Primary Examiner — Tat Chio
(74) Attorney, Agent, or Firm — Barbara R. Doutre

(57) ABSTRACT

A communication system and method provide fight detection capability. Bodily parameters associated with fighting, such as limb movements, are pre-stored and individualized for a particular user. The characterization of a fight using limb movements allows for a system that can recognize a fight even when a user is unable to call for assistance. Other bodily parameters are further monitored and weighted to distinguish a fight from other activities. The automatic notification to a dispatch center or control center and notification to peer radios expedites the ability to bring aid to the user.

12 Claims, 3 Drawing Sheets

(56) References Cited

U.S. PATENT DOCUMENTS

| | | | | |
|---|---|---|---|---|
| 2011/0237287 A1* | 9/2011 | Klein | ................ | H04M 3/42178 |
| | | | | 455/521 |
| 2012/0011559 A1 | 1/2012 | Miettinen et al. | | |
| 2012/0185910 A1 | 7/2012 | Miettinen et al. | | |
| 2013/0002433 A1* | 1/2013 | Wilmeth | ................ | G08B 21/22 |
| | | | | 340/573.4 |
| 2013/0013544 A1 | 1/2013 | Lee | | |

FOREIGN PATENT DOCUMENTS

| | | |
|---|---|---|
| WO | 2004105600 A1 | 12/2004 |
| WO | 2010115186 A1 | 10/2010 |
| WO | 2011057306 A1 | 5/2011 |

* cited by examiner

COMMUNICATION SYSTEM WITH IMPROVED SAFETY FEATURE

FIELD OF THE INVENTION

The present invention relates generally to communication systems and more particularly to communication systems which monitor actions of a user.

BACKGROUND

Communication systems, particularly those utilized by law enforcement personnel, serve to protect the well being of an officer as well as the public. A police officer's radio is a key piece of equipment for maintaining safety allowing the officer to communicate with other users of the system. However, when an officer is faced with an immediate emergency, such as a fight or assault, he or she may not have time to call for back-up assistance. While cameras have begun to be introduced into some public safety systems, the officer is still typically required to turn on the camera. Continuous operation of a camera takes up considerable battery life and is thus undesirable. An officer in the process of defending himself or protecting others may find that he or she is left without assistance and without any recording of events that might have been used as future evidence.

Accordingly, there is a need for an improved communication system that addresses the aforementioned issues. Such as system would provide a safety feature particularly useful to the public safety communications market.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
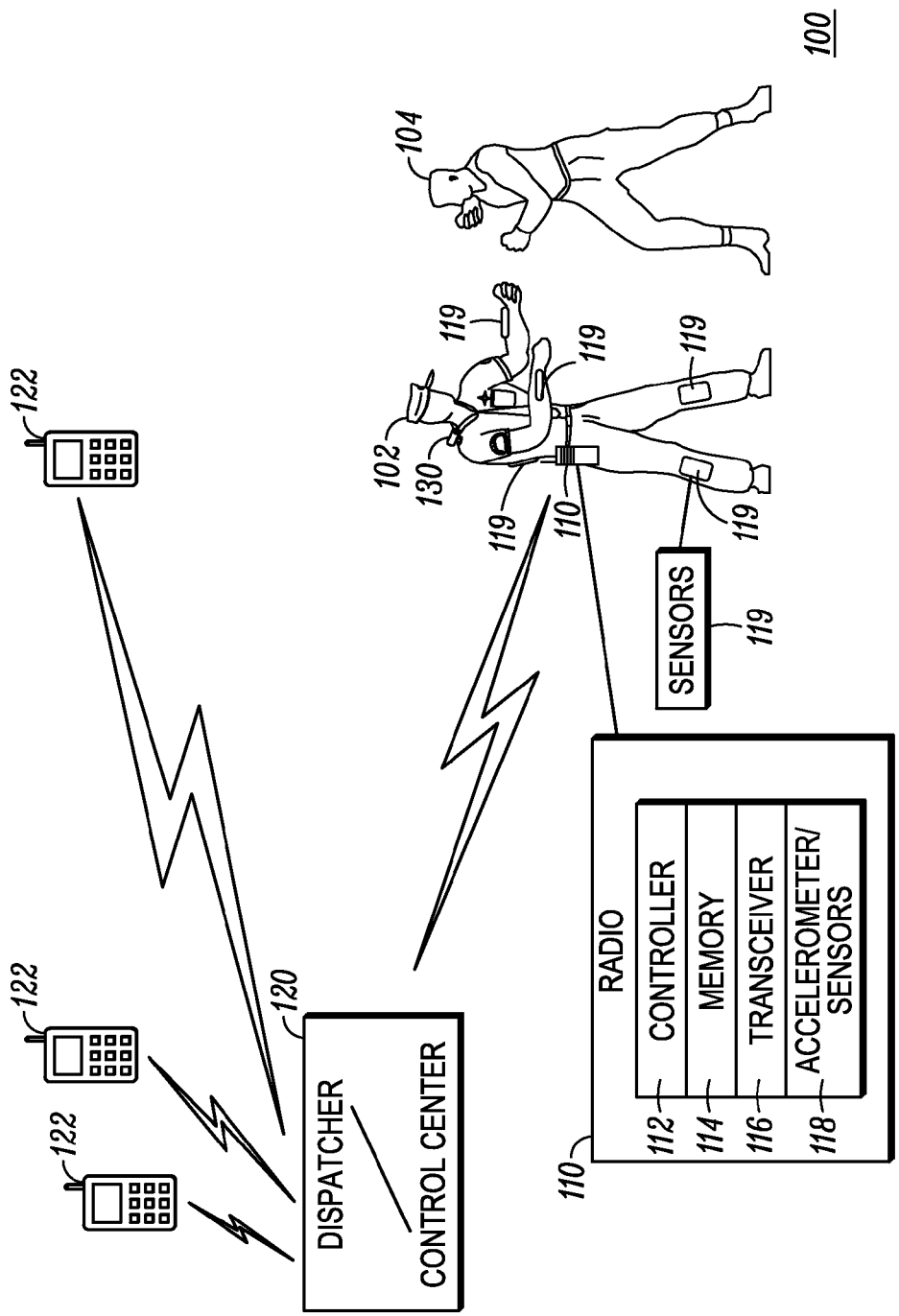
FIG. 1 illustrates a communication system formed and operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a communication system providing fight detection capability. The communication system may further provide automated recording features when a fight has been detected. The communication system may further provide notification alerts that a fight is taking place.

Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIG. 1, there is shown a communication system 100 formed and operating in accordance with the various embodiments. Communication system 100 provides automated fight detection capability and notification to facilitate protecting a subject user 102 from a perpetrator 104. Communication system 100 comprises a portable communication device 110, such as a portable two-way radio, a plurality of body worn sensors 119, and a body worn camera 130. The plurality of body worn sensors 119 and the body worn camera 130 are operatively coupled, either wired or wirelessly, to portable communication device 110. Portable communication device 110 comprises a controller 112 and a transceiver 116 for monitoring the body worn sensors 119 and automatically enabling the body worn camera 130 to record images in response to detecting predetermined parameters indicating a fight between user 102 and perpetrator 104. For the purposes of this application a fight will be defined as bodily actions by a person during a battle or physical combat, especially to strive to overcome a person by blows or weapons. Examples of fighting also include, but are not limited to, bodily movements associated with a struggle, physical altercation or brawl.

The body worn camera 130 may comprise a small image recording device mounted to the user's 102 clothing, equipment, or body. Examples of the body worn camera 130 may include, but are not limited to, a camera integrated or coupled to eyewear, a uniform, a cap, a belt or mounting mechanism about the user's ear or head. Videos can be streamed to the portable communication device 110 and uploaded real-time to a dispatch center 120 or central database. Images and video can further be stored in a memory 114 of the portable communication device 110.

The images may be time-stamped to further identify the user 102 who created the recording. The communication system may further comprise audio recording circuitry for automatically recording the audio associated with the fight.

Once the dispatch center 120 or central database is alerted to the fight, the dispatch center may further notify other communication devices within the system 100, such as a plurality of communication devices 122. The users of these other devices 122 may then proceed to provide back-up assistance to user 102. The controller 112 of portable communication device 110 can detect if the sensor has been removed, such as if the sensor is ripped away from the user.

In accordance with the various embodiments, a plurality of sensors monitor the bodily parameters associated with user 102 to detect if a fight is taking place.

In operation, the sensors 119 are preferably coupled to the wrists and ankles of user 102 to monitor the user's limb movements. The sensors 119 may contain accelerometers, gyroscopes, magnetometers, or other similar sensors, and may contain any combination of these. The sensors 119 measure stance, patterns, and transitions between movements which indicate such actions as a punch, a kick, or a blocking move. Detection of these actions and conditions can be based on various algorithms and may be based on training data. In one embodiment, an algorithm may detect how many high acceleration limb movements occur in a short time frame, such as five seconds, to detect a high level of limb movement. In another embodiment, training data can be collected per user with the user performing patterns and transitions. Martial arts movements are an example of the types of limb transitions that can be associated with a fight. For example, spinning kicks, jump kicks, flying kicks, multiple kicks and spinning hand techniques. In other embodiments, training data may be collected across many users and well known machine learning techniques can be used to detect these conditions and actions, so that per user training would not be required. These specific training methods and algorithms are illustrative, and variations on these options are foreseen. Algorithm thresholds and/or training data needed to run the algorithms are stored into memory 114 of portable communication device 110. Additional sensors 118 may be located on the portable communication device 110, such as accelerometers, gyroscopes, magnetometers, or global positioning system receivers. These sensors 118, together with sensors 119, that can be anywhere on the user's body, can be used to detect whether the user is running. Additional sensors may be provided to further monitor the user's personal activity level. For the purposes of this application, a user's personal activity level comprises vital signs, such as heart rate and body temperature, as well as motion of the body. Personal activity level indicating a fight can likewise be stored into memory 114. In accordance with some embodiments, the stored personal activity parameters may be used as the sole parameters for indicating a fight. Physical activity can be monitored with non-limb body worn sensors, which as mentioned earlier, includes motion-sensing. The addition of limb movement monitoring, through additional sensors on the user's limbs, along with comparison to predetermined thresholds provides additional accuracy.

Thus, in accordance with the various embodiments a plurality of sensor data is monitored by the radio controller 112 to determine a whether a fight taking place based on a combination of conditions, such as running, personal activity level, and limb movements. Different weighting factors are applied to each parameter to generate confidence levels for each action. The combination of parameters and weighting levels facilitate being able to distinguish between a fight and other actions taken by the user.

Accordingly, communication system 100 advantageously provides individualized characterization of a user's body movements and functions which allows for the identification of the user being in a fight. The video and alert to other support personnel facilitates the ability to bring aid to the individual as well as video storage for future evidentiary data.

Figure 2:
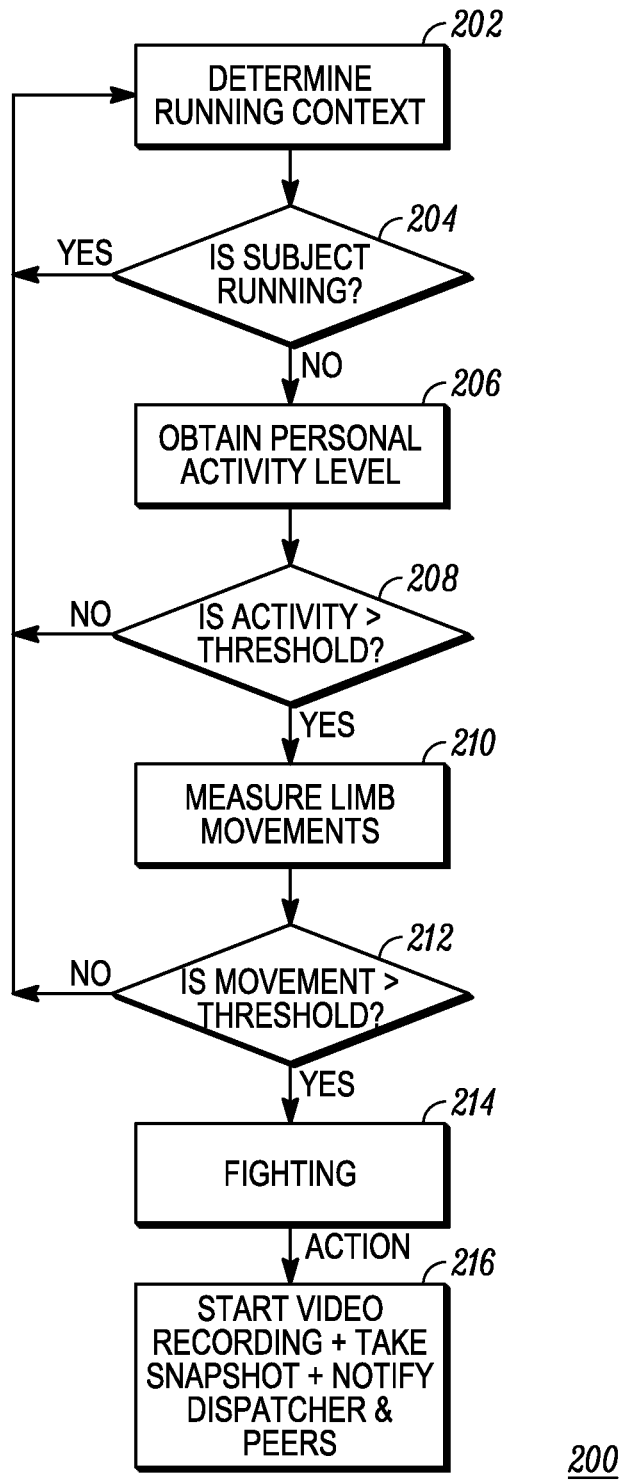
FIG. 2 is a flowchart of a method for the communication system to detect a fight in accordance with the various embodiments.

FIG. 2 is a flowchart of a method 200 for detecting a fight by the communication system operating in accordance with the various embodiments. Method 200 begins by determining a running context at 202. Officers may have to run for various reasons and Method 200 assumes running is an indication of not fighting. If no running is detected at 204, a personal activity level is obtained at 206. The personal activity level may comprise measurement of motion from sensor 118 and sensors that are not on the limbs and vital signs such as heart rate, body temperature, and the like. An individual who is fighting can be expected to have increased heart rate and body temperature. If the user's activity level exceeds a predetermined threshold at 208, then the method continues to 210 to measure movement of the user's limbs. The sensors monitoring movement of the limbs gather data pertaining to transitional movements of the user's arms, legs and torso. If the movement of the limbs, as sensed by the sensors, exceeds a predetermined movement threshold, then a fight is determined at 214. A fight being determined at 214 begins the video recording or snapshot of events, as well as notification to the dispatcher and peers.

An alternative option may comprise bypassing the limb movement to detect fighting if the activity level is extremely high, or for embodiments that do not include sensors on limbs.

Figure 3:
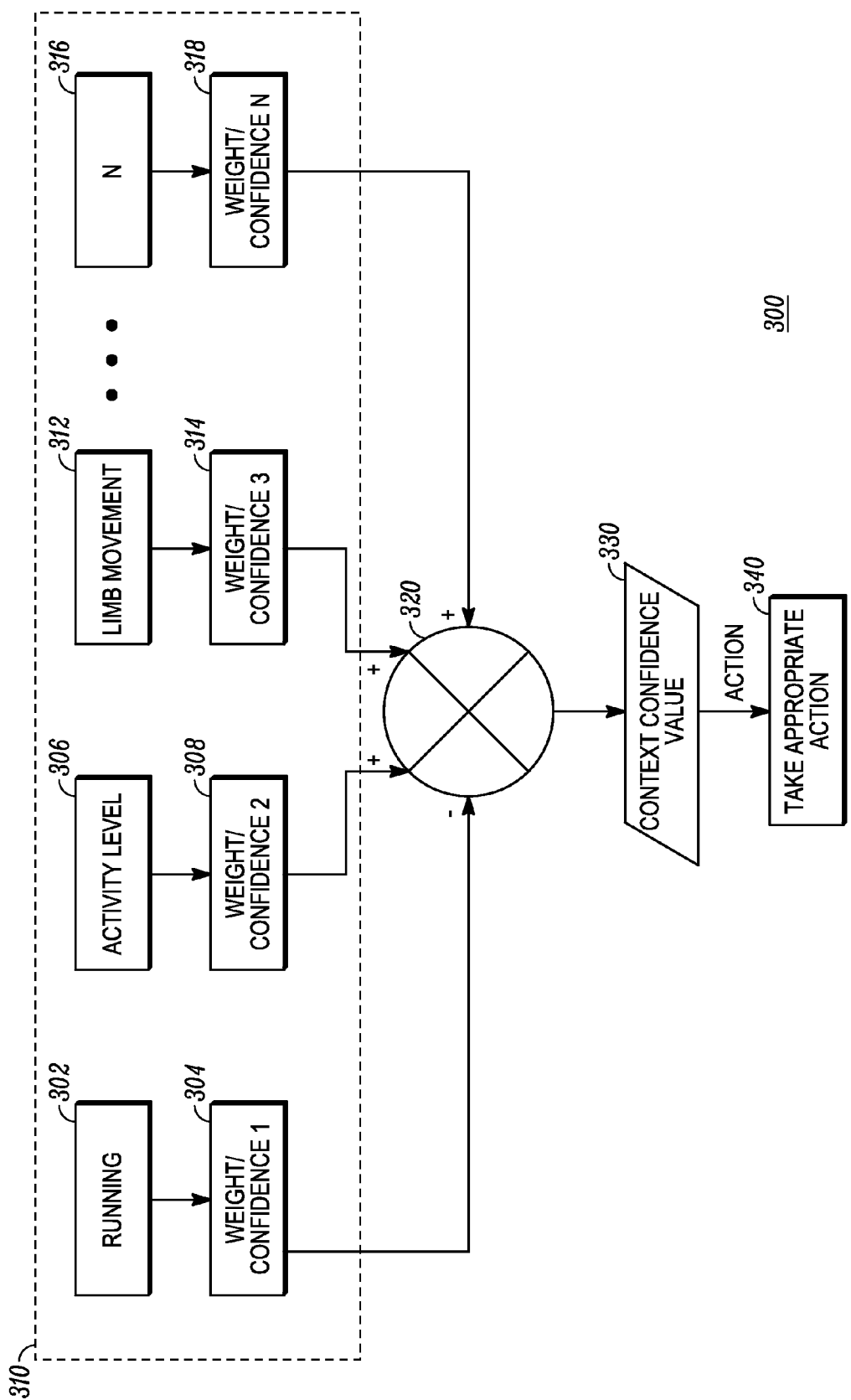
FIG. 3 is a flow diagram of a method for the communication system in accordance with the various embodiments.

FIG. 3 is a flow diagram of a method 300 of the communication system in accordance with the various embodiments. Method 300 utilizes a plurality of different conditions which are monitored by sensors of the communication system. In this embodiment, an aggregate approach 310 is used to monitor each of the conditions in parallel. The conditions comprise running 302, activity level 306, and limb movement 312. Each of the plurality of conditions is obtained and weighted with a respective confidence level. A measure for a running context of a subject within the system is obtained at 302 and weighted with a first confidence level at 304. A measure of personal activity for the subject is obtained at 306 and weighted with a second confidence level at 308. A measure for a limb movement of the subject is obtained at 312 and weighted with a third confidence level at 314. Other conditions 316 having associated confidence levels 318 may also form part of the parallel aggregate 310 of sensor data, as previously described. Additionally, the removal of a sensor, such as a sensor being ripped off the user's body, will be detected as a highly weighted parameter. At 320, the measurements are multiplied by the weighting coefficients and summed In this embodiment, the running measure coefficient is negative while the other coefficients are positive. This is because the running parameter is deemed to be less of a fight indicator. Based on the summation at 320, a context confidence value is generated at 330 for taking appropriate action at 340. When a fight is detected in response to the summation of the weighted measures exceeding a predetermined threshold, the appropriate action taken at 340 may comprise recording video, images, and/or dispatch alerting and or peer alerting at 340.

Accordingly, there has been provided a communication system in which characterization of a fight is pre-stored and individualized for a particular user, such as an officer. The characterization of a fight using predetermined bodily parameters stored within a portable communication device provides on the scene fight detection capability. The use of pre-stored bodily parameters such as personal activity levels, whether alone or in combination with limb movement thresholds in conjunction with sensor monitoring of these parameters provides for automated fight detection capability. Hence, the communication system is able to recognize a fight even when an officer is unable to call for assistance. The automatic notification to a dispatch center or control center and notification to peer radios expedites the ability to bring aid to the user.

The value of the communication aspects of the invention facilitates the ability to bring aid to a user of the portable communication device and maintain a record of events. However, the apparatus and methods for detection of a fighting state further apply to embodiments that do not contain a communicative element. Specifically, if communication device 110 comprises a controller but lacks a transceiver, the fighting state can still be detected, and used for other outcomes of the detection by combining it with other apparatuses implementing other actions. Thus, the fight detection capability, on its own, is considered a benefit.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communication system, comprising:
    a portable communication device; and
    a plurality of body worn sensors operatively coupled to the portable communication device, the portable communication device comprising a controller and a transceiver for monitoring the body worn sensors to automatically detect predetermined parameters indicative of a fight, and the portable communication device generating an output signal in response thereto,
    wherein removal of at least one of the plurality of body worn sensors without disabling the system is a further indication of a fight.

2. The communication system of claim 1, wherein the portable communication device comprises a camera that automatically records images or video of the fight in response to the fight being indicated.

3. The communication system of claim 1, further comprising:
    a body worn camera operatively coupled to the portable communication device, the body worn camera automatically recording images or video in response the fight being indicated.

4. The communication system of claim 1, wherein the predetermined parameters comprise predetermined limb movements.

5. The communication system of claim 4, wherein the predetermined limb movements are based on limb movements of a subject user of the portable communication device.

6. The communication system of claim 1, further comprising:
    a dispatch center for receiving the signal generated from the portable communication device indicating that the fight is taking place.

7. The communication system of claim 6, further comprising:
    a plurality of radios, the plurality of radios receiving a notification from the dispatch center that the fight is taking place.

8. The communication system of claim 1, wherein the portable communication device automatically records images, video, and audio of the fight and uploads the recording of the fight to a dispatch center.

9. The communication system of claim 1, wherein the body worn camera comprises at least one of: a uniform patrol camera, camera embedded in eyeglasses, cap, belt, or worn on any body part of the user's body.

10. The communication system of claim 1, wherein the portable communication device comprises a two-way radio.

11. The communication system of claim 1, wherein the portable communication device comprises a memory for storing the predetermined parameters indicative of a fight, the predetermined parameters being weighted at different confidence levels.

12. The communication system of claim 1, wherein the predetermined parameters comprise at least one of: activity level and limb movement.

* * * * *